United States Patent
Kaneko

(10) Patent No.: US 6,863,947 B2
(45) Date of Patent: Mar. 8, 2005

(54) GLASS SUBSTRATE FOR MAGNETIC DISKS AND PROCESS FOR ITS PRODUCTION

(75) Inventor: Masami Kaneko, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/180,334

(22) Filed: Jun. 27, 2002

(65) Prior Publication Data

US 2003/0017296 A1 Jan. 23, 2003

(30) Foreign Application Priority Data

Jun. 28, 2001 (JP) ........................................ 2001-196590

(51) Int. Cl.$^7$ ................................................ G11B 5/82
(52) U.S. Cl. ...................... 428/65.3; 428/66.7; 428/432; 428/428; 428/429; 428/409; 428/410; 428/694 SG
(58) Field of Search ............................ 428/65.3, 66.7, 428/432, 428, 429, 409, 410, 694 SG

(56) References Cited

U.S. PATENT DOCUMENTS

| | | | | |
|---|---|---|---|---|
| 5,436,083 A | * | 7/1995 | Haluska et al. | 428/688 |
| 5,569,518 A | | 10/1996 | Hayashi | |
| 5,776,599 A | * | 7/1998 | Haluska et al. | 428/323 |
| 5,914,151 A | | 6/1999 | Usuki | |
| 5,955,179 A | * | 9/1999 | Kickelhain et al. | 428/210 |
| 6,217,980 B1 | * | 4/2001 | Takahashi et al. | 428/141 |
| 6,228,429 B1 | * | 5/2001 | Bluck et al. | 427/331 |

FOREIGN PATENT DOCUMENTS

| | | | |
|---|---|---|---|
| JP | 2-301017 | | 12/1990 |
| JP | 11-102515 | * | 4/1999 |

* cited by examiner

Primary Examiner—Stevan A. Resan
(74) Attorney, Agent, or Firm—Oblon, Spivak, McClelland, Maier & Neustadt, P.C.

(57) ABSTRACT

A glass substrate for magnetic disks, which is a doughnut-type glass substrate having an inner periphery and an outer periphery, wherein an electrically conductive coat is formed on at least the outer peripheral edge surface.

6 Claims, No Drawings

GLASS SUBSTRATE FOR MAGNETIC DISKS AND PROCESS FOR ITS PRODUCTION

BACKGROUND OF THE INVENTION

1. Field of the Invention

The present invention relates to a glass substrate for magnetic disks having high strength, on which a magnetic layer is easily formed by sputtering, and a process for its production.

2. Discussion of Background

As a substrate for magnetic disks to be used for e.g. magnetic disk memory devices, an aluminum alloy substrate has been mainly employed. However, along with the demand for high density recording, a glass substrate has now been employed which is excellent in flatness and smoothness, of which the base material itself is hard and has a high rigidity as compared with an aluminum alloy substrate, and which can be made thin.

For production of a magnetic disk, an under layer treatment is applied to the surface of a doughnut-type substrate, then a magnetic layer is formed by sputtering, a protective layer is formed on the magnetic layer, and a lubricant layer is further formed on the protective layer. When the magnetic layer is formed by sputtering, usually the doughnut-type substrate is put in a sputtering apparatus while it is supported at three points on its outer periphery by metal support members, and the magnetic layer is formed by sputtering while applying a bias voltage to between the substrate and the target.

In a case of a conventionally used aluminum alloy substrate, the substrate itself has electrical conductivity, and thus the substrate is grounded by means of the metal support members, whereby there is no problem with the application of a bias at the time of the sputtering, whereas in a case of a glass substrate, the glass substrate is an insulating material, whereby the substrate cannot be grounded, and thus it tends to be difficult to apply a bias at the time of the sputtering. Further, in the case of the glass substrate which is an insulating material, static electricity is likely to be generated, and attachment of dust is likely to occur.

Further, the glass substrate which is a brittle material, is likely to break during handling or during use, which is regarded as one of the problems. One of factors governing the mechanical strength of a doughnut-type glass substrate for magnetic disks, is scratches which are present on the inner peripheral edge surface of the glass substrate where the maximum tensile stress will be exerted during use of the magnetic disks. As a glass substrate to solve the problem of scratches, JP-A-2-301017 discloses a glass substrate for information recording disks, wherein a continuous layer of an oxide or a continuous layer composed mainly of an oxide having a thickness of from 0.2 to 50 μm, is formed on the inner peripheral side surface or on the inner peripheral side surface and on the surface portion along the inner periphery.

SUMMARY OF THE INVENTION

The present invention has been made to overcome such problems that when a magnetic layer is formed on a glass substrate for magnetic disks by sputtering, the substrate cannot be grounded and it tends to be difficult to apply a bias during the sputtering, and to overcome such problems that static electricity is likely to be generated and attachment of e.g. dust is likely to occur, and it is an object of the present invention to provide a glass substrate for magnetic disks having higher strength and a process for its production.

The present invention provides a glass substrate for magnetic disks, which is a doughnut-type glass substrate having an inner periphery and an outer periphery, wherein an electrically conductive coat is formed on at least the outer peripheral edge surface, and a process for producing a glass substrate for magnetic disks, which comprises forming an electrically conductive coat on at least the outer peripheral edge surface of a doughnut-type glass substrate having an inner periphery and an outer periphery.

The electrically conductive coat formed on at least the outer peripheral edge surface of the doughnut-type glass substrate of the present invention may, for example, be a layer containing electrically conductive fine particles, a metal layer formed by plating or a metal layer formed by sputtering. More specifically, as the electrically conductive coat, an oxide layer such as a silica layer containing electrically conductive fine particles, particularly a silica layer obtained by curing a coating composition containing electrically conductive fine particles and a polysilazane, is preferably mentioned. The electrically conductive coat is required to be formed on the outer peripheral edge surface of the doughnut-type glass substrate, but may further be formed on the inner peripheral edge surface in order to increase the strength.

Further, in the process for producing a glass substrate for magnetic disks of the present invention, at least the outer peripheral edge surface of the doughnut-type glass substrate having an inner periphery and an outer periphery is preferably subjected to etching treatment with an etching solution, and then an electrically conductive coat is formed on at least the outer peripheral edge surface. Preferably, the electrically conductive coat is formed on the outer peripheral edge surface and inner peripheral edge surface.

DETAILED DESCRIPTION OF THE PREFERRED EMBODIMENTS

The shape of the glass substrate for magnetic disks of the present invention is a doughnut-type having an inner periphery and an outer periphery i.e. a disk-shape having a hole at a center portion cored and having a predetermined radius, and is a glass substrate having a shape such that a circle having the same center as the center of the disk is cored. Its dimensions are various and not particularly limited, for example, such that (a) the inner diameter is 20 mm, the outer diameter is 65 mm and the plate thickness is 0.635 mm, (b) the inner diameter is 25 mm, the outer diameter is 84 mm and the plate thickness is 1.0 mm, (c) the inner diameter is 25 mm, the outer diameter is 95 mm and the plate thickness is 1.0 mm, (d) the inner diameter is 25 mm, the outer diameter is 84 mm and the plate thickness is 1.27 mm, or (e) the inner diameter is 25 mm, the outer diameter is 95 mm and the plate thickness is 1.27 mm.

As the electrically conductive coat to be formed on at least the outer peripheral edge surface of the doughnut-type glass substrate of the present invention, various ones may be mentioned as described above, but the following may be mentioned as specific examples.

A silica layer obtained by curing a coating composition containing a polysilazane and electrically conductive fine particles, a silica layer obtained by curing a coating composition containing electrically conductive fine particles and a precursor compound of e.g. a silicon/alkoxide compound which forms a silica layer by sol-gel method, a Ni—P metal layer formed by plating, an Au layer, a metal layer of e.g. Ag, or a metal layer formed by sputtering such as a Cr layer or a Ni—P metal layer. Here, the metal layer includes an alloy layer.

As the electrically conductive fine particles, electrically conductive fine particles made of indium oxide doped with tin, electrically conductive fine particles made of tin oxide doped with antimony, electrically conductive fine particles made of tin oxide doped with fluorine, electrically conductive fine particles made of zinc oxide doped with aluminum or gallium, electrically conductive fine particles comprising fine particles of titanium oxide and an electrically conductive layer made of tin oxide doped with antimony coated on the surface of the titanium oxide fine particles, and other various electrically conductive fine particles may be used.

When the doughnut-type glass substrate is put in a sputtering apparatus to form a layer such as an under layer or a magnetic layer on the doughnut-type glass substrate by sputtering, the outer peripheral edge surface of the doughnut-type glass substrate is supported at three points by support members made of a metal, and a bias voltage is applied to between the target and the substrate, and accordingly it is required to form the electrically conductive coat on at least the outer peripheral edge surface so that the electric current is conducted from the doughnut-type glass substrate to the metal support members, and the substrate is grounded via the metal support members. The electrically conductive coat is preferably formed on the entire outer peripheral edge surface of the doughnut-type glass substrate. When the electrically conductive coat is formed on the entire outer peripheral edge surface, it is not necessary to seek the positions where the electrically conductive coat is formed on the outer peripheral edge surface of the doughnut-type glass substrate when the substrate is supported by the metal support members at three points.

The surface resistance of the electrically conductive coat is suitably at most $10^{10}$ Ω/□ from the above purpose.

It is preferred to form the electrically conductive coat to cover the edge portion of each side of the substrate so that the electric current is conducted from the sputtered layer to the electrically conductive coat when a bias voltage is applied to between the substrate and the target at the time of the sputtering.

The electrically conductive fine particles are preferably ones having a primary particle size at a level of from 0.01 to 0.5 $\mu$m. Particularly, ultrafine particles having a primary particle size at a level of from 0.1 to 0.3 $\mu$m are preferred in view of the balance between the smoothness of the coat and the electrical conductivity.

The oxide layer containing electrically conductive fine particles, particularly the silica layer, is preferably a layer having a hardness corresponding to a pencil scratch value of at least 5H in such a state that the layer is formed on at least the outer peripheral edge surface or the outer peripheral and inner peripheral edge surfaces of the doughnut-type glass substrate, whereby the outer peripheral edge surface or the inner peripheral and outer peripheral edge surfaces are protected from scratching. If it is 4H or less, scratches which occur e.g. during handling of the glass substrate for magnetic disks may penetrate through the electrically conductive coat and reach the inner peripheral or outer peripheral edge surface, whereby the mechanical strength is likely to deteriorate. It is preferably at least 6H, more preferably at least 7H, particularly preferably at least 8H. The pencil scratch value is one obtained by scratching the protective layer with a pencil lead in accordance with JIS K5400, 8.4.2 (scratching method) and represented by the density symbol of the pencil.

To form the electrically conductive coat on at least the outer peripheral edge surface or the inner peripheral and outer peripheral edge surfaces of the doughnut-type glass substrate, it is preferred to preliminarily subject at least the outer peripheral edge surface or the inner peripheral and outer peripheral edge surfaces to etching treatment with an etching solution.

For the above etching treatment, a common etching method for glass, such as a wet etching method by means of an etching liquid or a dry etching method by means of an etching gas, may, for example, be used. Among them, a wet etching method employing an etching liquid such as a hydrofluoric acid solution, a hydrofluoric sulfuric acid solution or a hydrosilicofluoric acid solution, can be suitably employed. Particularly, a method employing a hydrofluoric sulfuric acid solution is preferred. Such etching treatment is carried out within a range not to form high projections on the glass substrate surface.

Further, it is preferred to finish the inner and outer peripheral edge surfaces, particularly the inner peripheral edge surface, of the doughnut-type glass substrate, with abrasive grains at a level of from #200 to #1000 mesh, prior to the etching treatment.

By the etching treatment, it is possible to remove deep scratches present on the inner and outer peripheral edge surfaces, which govern the bending strength of the doughnut-type glass substrate, particularly deep scratches on the inner peripheral edge surface, which more strongly govern the bending strength, whereby a decrease in strength of the doughnut-type glass substrate can be prevented.

The etching depth by the etching treatment is preferably from 15 to 40 $\mu$m. If the depth is less than 15 $\mu$m, removal of deep scratches present on the inner peripheral edge surface tends to be inadequate, whereby the mechanical strength tends to be low. If it exceeds 40 $\mu$m, high projections are likely to form on the glass substrate surfaces.

Now, the silica layer obtained by curing a coating composition containing electrically conductive fine particles and a polysilazane (hereinafter referred to as a curable coating composition) will be described below.

As the electrically conductive fine particles, the above-described electrically conductive fine particles made of indium oxide doped with tin, electrically conductive fine particles made of tin oxide doped with antimony, electrically conductive fine particles made of tin oxide doped with fluorine, electrically conductive fine particles made of zinc oxide doped with aluminum or gallium, electrically conductive fine particles comprising fine particles of titanium oxide and an electrically conductive layer made of tin oxide doped with antimony, coated on the surface of the titanium oxide fine particles, and other various electrically conductive fine particles may be used.

The polysilazane is an inorganic polymer soluble in an organic solvent, whereby it is less likely that organic groups will remain in the silica layer. As a result, it is less likely that gas will be generated in the vacuum process for the production of a magnetic disk. Further, it is less likely that water will remain in the silica layer. Accordingly, deterioration of the properties of the magnetic layer due to generation of gas in the vacuum process, is less likely to occur.

The above curable coating composition basically contains the polysilazane, electrically conductive fine particles and a solvent. Further, it may contain a catalyst or other additives in addition to the solvent. The polysilazane is a polymer having at least two units of (—Si—N—). In this chemical formula, each of the remaining two bonds of the Si atom (tetravalent) or the remaining one bond of the N atom (trivalent) has an H atom or an organic group (such as an alkyl group) bonded thereto. Further, it may be not only a polymer of a linear structure composed solely of the above repeating units but also a polymer having a ring structure formed by bonding of one or both of the remaining two bonds of the above Si atom with the bond of the above nitrogen atom. The polymer may also be composed solely of repeating units of a ring structure, or may be a linear polymer partially having a ring structure.

These polysilazanes may be polysilazanes as disclosed, for example, in JP-A-9-31333 or in the literatures cited therein. Such polysilazanes may be employed as a matrix material in which electrically conductive fine particles are contained for formation of the electrically conductive coat of the present invention. Further, modified polysilazanes as disclosed in JP-A-9-31333 or in the literatures cited therein, may also be used as the polysilazane similarly.

The polysilazane decomposes in the presence of oxygen, so that N atoms are replaced with O atoms to form silica. The silica formed from the polysilazane is highly dense as compared with silica formed from a hydrolyzable silane compound. For example, silica formed from a perhydropolysilazane is more dense and superior in the surface properties such as abrasion resistance as compared with silica formed from a tetra-functional hydrolyzable silane compound (such as a tetraalkoxysilane).

The polysilazane may, for example, be a polysilazane (perhydropolysilazane) containing substantially no organic group, a polysilazane having hydrolyzable groups such as alkoxy groups bonded to Si atoms, or a polysilazane having organic groups such as alkyl groups bonded to Si atoms or N atoms (hereinafter the latter two will be referred to as an organic type polysilazane).

The polysilazane is a polymer having a linear, cyclic or cross-linked structure, or a mixture of polymers having such plurality of structures in their molecules. The molecular weight of the polysilazane is preferably from 200 to 50,000 as the number average molecular weight. If the number average molecular weight is less than 200, it tends to be difficult to obtain a uniform silica layer, even if curing can be done. On the other hand, if the number average molecular weight exceeds 50,000, the polysilazane tends to be hardly soluble in a solvent, and the above mentioned curable coating composition tends to be viscous.

The solvent for the polysilazane may, for example, be a hydrocarbon solvent such as an aliphatic hydrocarbon, an alicyclic hydrocarbon or an aromatic hydrocarbon, a halogenated hydrocarbon solvent, or an ether such as an aliphatic ether or an alicyclic ether.

These solvents may be used in combination as a mixture of a plurality of solvents in order to adjust the solubility of the polysilazane or the evaporation rate of the solvent.

The amount of the solvent may vary depending upon the coating method of the above curable coating composition, the structure and the average molecular weight of the polysilazane, etc., but it is usually preferred that the solid content concentration will be from 0.5 to 80 wt %.

In order to lower the curing temperature of the polysilazane, a catalyst is usually employed. By properly selecting the type and the amount of the catalyst, curing can be carried out at a lower temperature, and in some cases, curing can be carried out at room temperature. The atmosphere for curing is preferably an atmosphere in which oxygen such as air is present.

By the curing of the polysilazane, its N atoms are replaced with O atoms to form silica. By carrying out the curing in an atmosphere wherein sufficient oxygen is present, it is possible to form a dense silica layer. Further, treatment with water or steam is also useful for curing at a low temperature (JP-A-7-223867).

As the catalyst, it is preferred to employ a catalyst which is capable of curing the polysilazane at a lower temperature. As such a catalyst, a metal catalyst composed of fine particles of a metal such as gold, silver, palladium, platinum or nickel (JP-A-7-196986), an amine or an acid (JP-A-9-31333) may, for example, be mentioned. The amine may, for example, be an alkylamine, a dialkylamine, a trialkylamine, arylamine, diarylamine or cyclicamine. The acid may, for example, be an organic acid such as acetic acid, or an inorganic acid such as hydrochloric acid.

When a catalyst is incorporated to the polysilazane, the amount of the catalyst is usually from 0.01 to 10 parts by weight, preferably from 0.05 to 5 parts by weight, per 100 parts by weight of the polysilazane. If the amount is less than 0.01 part by weight, no adequate catalytic effect can be expected, and if it exceeds 10 parts by weight, coagulation of the catalyst particles is likely to take place, whereby the transparency is likely to be impaired.

Further, to the above curable coating composition, a stabilizer such as an ultraviolet absorber, a photostabilizer or an antioxidant, or a surfactant such as a leveling agent, a defoaming agent, a thickener, a precipitation-preventing agent, a dispersant or an antistatic agent, may suitably be incorporated, as the case requires.

The thickness of the silica layer obtained by curing the above curable coating composition, is preferably from 0.05 to 10 μm. If it exceeds 10 μm, no further improvement in the scratch resistance can be expected, and the silica layer tends to be brittle, and cracks are likely to form in this silica layer even by a slight deformation of the glass substrate for magnetic disks. On the other hand, if it is less than 0.05 μm, the effect for improving the scratch resistance tends to be inadequate. A preferred thickness of the silica layer obtainable by curing the above curable coating composition is from 0.1 to 6 μm, particularly preferably from 0.1 to 4 μm.

Covering with the curable coating composition is preferably carried out by coating a coating liquid by means of a coating method, followed by curing by e.g. heating or firing.

When a coating method is used, it is essential to coat the coating liquid on at least outer peripheral edge surface, preferably on the inner and outer peripheral edge surfaces.

As the coating method, the following may, for example, be mentioned.

(1) A brush coating method in which coating is carried out by means of a brush.

(2) A roller coating method wherein the coating liquid is supplied to a porous surface of a roller brush made of e.g. a foamed plastic, and the roller of the roller brush is rotated at a rotational speed of from 10 to 200 rpm, so that it is brought in contact with the outer peripheral edge surface, or the inner peripheral edge surface and the outer peripheral edge surface of the doughnut-type glass substrate to transfer and coat the coating liquid. In this case, it is preferred that the doughnut-type glass substrate is also rotated at a rotational speed of from 30 to 100 rpm as vacuum-adsorbed.

(3) A direct coating method wherein the doughnut-type glass substrate is vacuum-held and rotated at a rotational speed of from 10 to 200 rpm, and a predetermined amount of the coating liquid is supplied from a dispenser and coated on the outer peripheral edge surface, or on the inner peripheral edge surface and the outer peripheral edge surface.

Particularly, when the curable coating composition containing a polysilazane and electrically conductive fine particles is used, it is less likely that water or an organic content will remain in the formed electrically conductive coat, and it is less likely that the properties of the magnetic layer deteriorate during the production of the magnetic disk, such being favorable. Further, the coating liquid of the present invention i.e. the coating composition containing a polysilazane has a low viscosity and thus is excellent in the operation efficiency. Further, in the present invention, there are little restrictions relating to the coating conditions such as the temperature and the pH of the coating liquid, and from this viewpoint, the present invention is excellent in the operation efficiency. As the restrictions from the operational viewpoint are thus little, there will be little restrictions to the apparatus for forming the coat, whereby the apparatus can be selected from a wide range.

Glass to be used for the glass substrate for magnetic disks of the present invention is not particularly limited, but for the improvement of the weather resistance, a glass having the following characteristics is preferred.

Water resistance: When the glass is immersed in water of 80° C. for 24 hours, the weight reduction of the glass (eluted amount) due to elution of components from the glass, is not more than 0.01 mg/cm$^2$.

Acid resistance: When the glass is immersed in a 0.1 N hydrochloric acid aqueous solution of 80° C. for 24 hours, the weight reduction of the glass (eluted amount) due to elution of components from the glass, is not more than 0.02 mg/cm$^2$.

Alkali resistance: When the glass is immersed in a 0.1 N sodium hydroxide aqueous solution of 80° C. for 24 hours, the weight reduction of the glass (eluted amount) due to elution of components from the glass is not more than 2 mg/cm$^2$, preferably not more than 0.5 mg/cm$^2$.

In the present invention, it is not required to use a chemical strengthening method by ion-exchanging, and there is no lower limit in the content of an alkali metal such as Na or Li with a view to making chemical strengthening possible. The glass which may be used for the glass substrate for magnetic disks of the present invention, may, for example, be alkali-free glass, a glass having an alkali metal oxide content of from 1 to 20 wt %, such as soda lime silica glass, or crystallized glass.

Now, the present invention will be described in further detail with reference to Examples. However, it should be understood that the present invention is by no means restricted to such specific Examples.

EXAMPLE 1

A doughnut-type glass substrate having an outer diameter of 95 mm, an inner diameter of 25 mm and a thickness of 1.1 mm was prepared which was made of glass A having a composition comprising 56 wt % of $SiO_2$, 6 wt % of $B_2O_3$, 11 wt % of $Al_2O_3$, 0.05 wt % of $Fe_2O_3$, 0.1 wt % of $Na_2O$, 2 wt % of MgO, 3 wt % of CaO, 15 wt % of BaO and 6.5 wt % of SrO.

The inner and outer peripheral edge surfaces of the doughnut-type glass substrate were subjected to finish polishing with diamond abrasive grains of #500 mesh under, so that the concentricity of the inner and outer peripheries (the distance between the centers of the inner peripheral circle and the outer peripheral circle) would be not more than 25 μm, and the roundness would be not more than 25 μm. Then, such a glass substrate was subjected to lapping with alumina abrasive grains having an average particle size of about 9 μm and polished until the thickness became about 0.9 mm. Such a glass substrate was further immersed in a hydrofluoric sulfuric acid solution containing 5% each of hydrofluoric acid and sulfuric acid, for 15 minutes to carry out etching treatment to an etching depth of about 20 μm.

Then, a curable coating composition containing electrically conductive tin oxide fine particles (tin oxide doped with antimony, primary particle size: about 0.2 to about 0.3 μ on the average) as electrically conductive fine particles and a xylene solution (solid content concentration: 20 wt %) of an organic type polysilazane ("L710", tradename, manufactured by Tonen K.K.) containing a catalyst and having a number average molecular weight of 1,000, was brush-coated mainly on the inner and outer peripheral edge surfaces of the etching-treated glass substrate. Then, it was dried in a constant temperature chamber at from 50 to 60° C. for from 10 to 20 minutes and then cured in an electric furnace at 400° C. for one hour. The thickness of the coat thereby formed was from about 2 to about 3 μm on the average.

Then, the surface of the glass substrate provided with this coat was subjected to polishing with cerium oxide having an average particle size of 2.5 μm to a thickness of about 0.81 mm. At that time, the coat extended beyond the inner and outer peripheral edge surfaces was also removed.

The surface resistance of the silica layer containing electrically conductive tin oxide fine particles formed on the entire inner peripheral and outer peripheral edge surfaces as obtained above, was from $10^8$ to $10^9$ Ω/□, and the pencil scratch value as the strength of the silica layer was investigated and found to be 8H.

EXAMPLE 2

A doughnut-type glass substrate having an outer diameter of 95 mm, an inner diameter of from 25.015 to 25.035 mm and a thickness of 0.85 mm, made of the glass A, was prepared. This doughnut-type glass substrate was subjected to finish polishing, lapping and etching treatment in the same manner as in Example 1.

On the outer peripheral and inner peripheral edge surfaces of the doughnut-type glass substrate subjected to etching treatment, a silica layer containing electrically conductive fine particles was formed in the same manner as in Example 1 except that electrically conductive zinc oxide fine particles (zinc oxide doped with aluminum, primary particle size: about 0.1 to about 0.3 μ on the average) were employed as the curing coating composition instead of the electrically conductive tin oxide fine particles used as the electrically conductive fine particles. The surface resistance of the silica layer containing electrically conductive zinc oxide fine particles formed on the entire inner peripheral and outer peripheral edge surfaces, was from $10^6$ to $10^8$ Ω/□, and the pencil scratch value of the silica layer on the doughnut-type glass substrate with its edge surfaces covered with the coat was investigated and found to be 8H.

This sample was subjected to the following damaging test, and the breaking stress was 16.1 kgf/mm$^2$. For the purpose of comparison, the breaking stress of a non-coated product which was not coated with the curable coating composition to form the curable coating composition layer, was measured and found to be 13.4 kgf/mm$^2$, and accordingly the strength was apparently higher in the present invention.

Damaging test: A damaging test sample was set on a circular cylinder made of stainless steel (diameter: 24.96 mm, height: 8 mm) secured on a disk made of stainless steel, and the sample was dropped from a height distanced by 7 mm (initial position) from the surface of the stainless steel disk. This operation was repeated 50 times, and then the sample was inverted and repeatedly dropped 50 times.

The breaking stress of the sample thus damaged, was measured by a strength tester (AUTOGRAPH, tradename) manufactured by Shimadzu Corporation. Namely, a stainless steel ball having a diameter of 36 mm was set on the inner periphery of the sample, and the sample was pressed by the ball at a pressing rate of 30 mm/min to breakage, whereupon the breaking stress was calculated from the load at the time of the breakage of the sample detected by a load cell.

EXAMPLE 3

A doughnut-type glass substrate having an outer diameter of 95 mm, an inner diameter of from 25.015 to 25.035 mm and a thickness of 1.1 mm was prepared which was made of glass B having a composition comprising 61.2 wt % of $SiO_2$, 11.5 wt % of $Al_2O_3$, 16.0 wt % of $Na_2O$, 2.1 wt % of $K_2O$, 2.9 wt % of $Li_2O$, 0.8 wt % of MgO, 2.9 wt % of CaO, 0.5 wt % of $TiO_2$, 1.9 wt % of $ZrO_2$ and 0.2 wt % of $SO_3$.

The inner and outer peripheral edge surfaces of the doughnut-type glass substrate were subjected to finish polishing with diamond abrasive grains of #500 mesh under, so that the concentricity of the inner and outer peripheries (the distance between the centers of the inner peripheral circle and the outer peripheral circle) would be not more than 25 $\mu$m, and the roundness would be not more than 25 $\mu$m. Then, such a glass substrate was subjected to lapping with alumina abrasive grains having an average particle size of 9 $\mu$m and polished until the thickness became about 0.9 mm. Such a glass substrate was further immersed in a hydrofluoric sulfuric acid solution containing 5% each of hydrofluoric acid and sulfuric acid, for 15 minutes to carry out etching treatment to an etching depth of about 20 $\mu$m.

Then, electrically conductive fine particles comprising fine particles of titanium oxide and an electrically conductive layer made of tin oxide doped with antimony, coated on the surface of the titanium oxide fine particles (tin oxide doped with antimony, primary particle size: about 0.2 to about 0.3 $\mu$ on the average) as electrically conductive fine particles and a xylene solution (solid content concentration: 20 wt %) of an organic type polysilazane ("L710", tradename, manufactured by Tonen K.K.) containing a catalyst and having a number average molecular weight of 1,000, was brush-coated mainly on the inner and outer peripheral edge surfaces of the etching-treated glass substrate. Then, it was dried in a constant temperature chamber at from 50 to 60° C. for from 10 to 20 minutes and then cured in an electric furnace at 400° C. for one hour. The thickness of the coat thereby formed was from about 2 to about 3 $\mu$m on the average.

Then, the surface of the glass substrate provided with this coat was subjected to polishing with cerium oxide having an average particle size of 2.5 $\mu$m to a thickness of about 0.81 mm. At that time, the coat extended beyond the inner and outer peripheral edge surfaces was also removed.

The electrical conductivity of the silica layer containing electrically conductive tin oxide fine particles formed on the entire inner peripheral and outer peripheral edge surfaces as obtained above, was from $10^8$ to $10^9$ $\Omega/\square$, and the pencil scratch value as the strength of the silica layer was investigated and found to be 8H. The sample was subjected to the damaging test, and the breaking stress (unit: kgf/mm$^2$) was 18.2 kgf/mm$^2$.

EXAMPLE 4

As Comparative Example, a glass substrate for magnetic disks having a curable coating composition formed thereon was prepared in the same manner as in Example 1 except that a curable coating composition containing a xylene solution (solid content concentration: 20 wt %) of an organic type polysilazane "L710", tradename, manufactured by Tonen K.K.) containing a catalyst and having a number average molecular weight of 1,000, containing no electrically conductive fine particles, was used as the curable coating composition.

The thickness of the sample thus obtained was from about 1 to about 4 $\mu$m on the average, the electrical conductivity of the silica layer containing no electrically conductive tin oxide fine particles, formed on the entire inner peripheral and outer peripheral edge surfaces was $10^{13}$ $\Omega/\square$, and the pencil scratch value as the hardness of the silica layer was 8H.

According to the present invention, a doughnut-type glass substrate for magnetic disks, having electrical conductivity imparted to at least the outer peripheral edge surface, can be provided, such problems can be overcome that when a magnetic layer is formed on the surface of the glass substrate for magnetic disks by sputtering, the substrate can not be grounded and it tends to be difficult to supply a bias at the time of the sputtering, and such problems can be overcome that static electricity is likely to be generated and attachment of e.g. dust is likely to occur on the surface of the glass substrate for magnetic disks.

Further, by employing an oxide coat containing electrically conductive fine particles and forming the oxide coat containing electrically conductive fine particles also on the inner peripheral edge surface of the doughnut-type glass substrate for magnetic disks, scratches which are present on the inner peripheral and outer peripheral edge surfaces of the glass substrate, which are one of factors governing the mechanical strength of the doughnut-type glass substrate for magnetic disks, can be covered, whereby the decrease in strength can be prevented.

Further, even when glass containing a large amount of alkali metal components is used as the substrate, infiltration of the alkali metal components in the glass substrate into the magnetic layer, which causes deterioration of the magnetic layer, can be prevented by the oxide coat.

The entire disclosure of Japanese Patent Application No. 2001-196590 filed on Jun. 28, 2001 including specification, claims and summary are incorporated herein by reference in its entirety.

What is claimed is:

1. A glass substrate having a disk shape with a hole at the center, an inner periphery and an outer periphery,
    wherein an electrically conductive coat is present on at least the entire outer peripheral edge surfaces, and
    wherein the electrically conductive coat contains at least one of tin oxide particles or zinc oxide particles.

2. The glass substrate according to claim 1, wherein the electrically conductive coat contains particles of at least one selected from the group consisting of electrically conductive tin oxide particles doped with antimony, electrically conductive tin oxide particles doped with fluorine, and electrically conductive zinc oxide particles doped with aluminum or gallium.

3. A glass substrate having a disk shape with a hole at the center, an inner periphery and an outer periphery,
    wherein an electrically conductive coat is present on at least the inner peripheral and the entire outer peripheral edge surfaces, and
    wherein the electrically conductive coat contains at least one of tin oxide particles or zinc oxide particles.

4. The glass substrate according to claim 3, wherein the electrically conductive coat contains particles of at least one selected from the group consisting of electrically conductive tin oxide particles doped with antimony, electrically conductive tin oxide particles doped with fluorine, and electrically conductive zinc oxide particles doped with aluminum or gallium.

5. A glass substrate having a disk shape with a hole at the center, an inner periphery and an outer periphery, wherein an electrically conductive coat is present on at least the entire outer peripheral edge surface, and wherein the electrically conductive coat is a layer containing electrically conductive particles comprising at least one selected from the group consisting of indium oxide doped with tin, electrically conductive tin oxide particles doped with antimony, electrically conductive tin oxide particles doped with fluorine, electrically conductive zinc oxide particles doped with aluminum or gallium, electrically conductive titanium oxide particles having an electrically conductive layer of tin oxide doped with antimony on the surface of the titanium oxide particles.

6. A glass substrate having a disk shape with a hole at the center, an inner periphery and an outer periphery, wherein an electrically conductive coat is present on at least the inner peripheral and the entire outer peripheral edge surfaces, and wherein the electrically conductive coat is a layer containing electrically conductive particles comprising at least one selected from the group consisting of indium oxide doped with tin, electrically conductive tin oxide particles doped with antimony, electrically conductive tin oxide particles doped with fluorine, electrically conductive zinc oxide particles doped with aluminum or gallium, electrically conductive titanium oxide particles having an electrically conductive layer of tin oxide doped with antimony on the surface of the titanium oxide particles.

* * * * *